Feb. 1, 1966    O. E. ROSAEN    3,232,432
FILTER DEVICES
Filed July 2, 1962    2 Sheets-Sheet 1
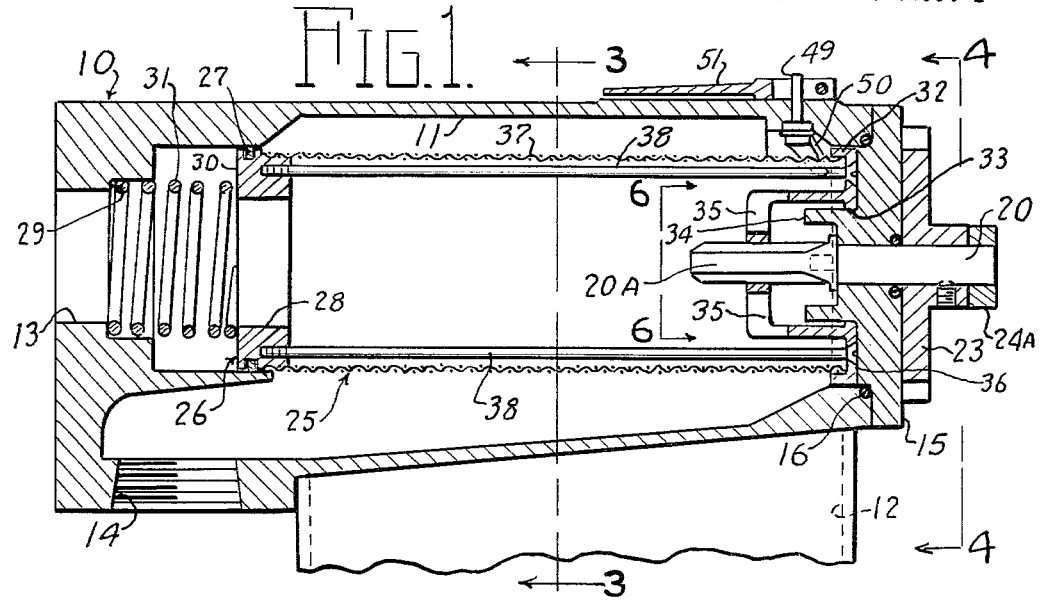
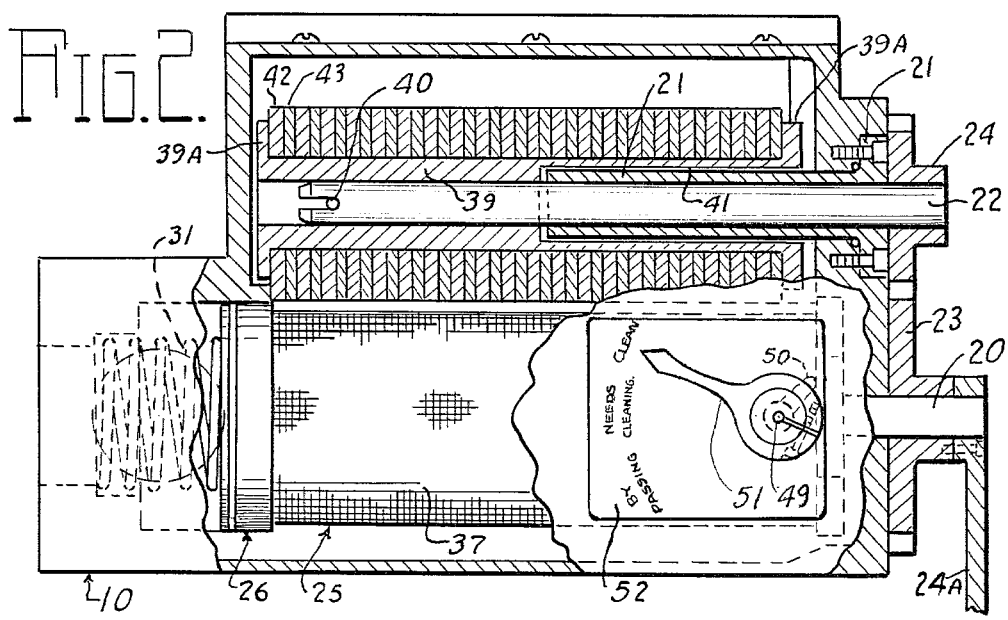
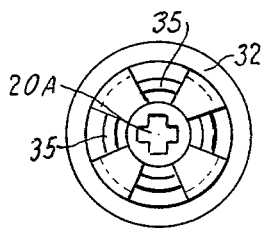
INVENTOR.
OSCAR E. ROSAEN
BY
Hauke & Hauke
ATTORNEYS Feb. 1, 1966     O. E. ROSAEN     3,232,432
FILTER DEVICES Filed July 2, 1962     2 Sheets-Sheet 2

INVENTOR.
OSCAR E. ROSAEN
BY Hauke + Hauke
ATTORNEYS

United States Patent Office 3,232,432
Patented Feb. 1, 1966

3,232,432
FILTER DEVICES
Oscar E. Rosaen, Grosse Pointe Farms, Mich., assignor to The Rosaen Filter Company, Hazel Park, Mich., a corporation of Michigan
Filed July 2, 1962, Ser. No. 206,667
9 Claims. (Cl. 210—90)

The present invention relates to a fluid filter device and more particularly to such a device having means which can be periodically operated to dislodge foreign matter tending to clog the filter element.

Heretofore much effort has been directed toward increasing the time between filter replacements by providing means for dislodging matter tending to clog the filter element. Filter clogging is an especially serious problem in systems which supply cooling and lubricating fluids to machinery wherein large quantities of dirt, metal particles and other foreign matter tend to accumulate in the fluid and must be removed before the fluid can be used.

Two copending applications, Ser. No. 24,330, now U.S. Patent No. 3,074,556 filed April 25, 1960, and Ser. No. 56,826, filed Sept. 19, 1960, now U.S. Patent No. 3,129,171 described fluid filter devices including means to remove foreign matter from the filter element. Although each of these devices has proven to be satisfactory, they each utilize a reversed flow of the fluid to dislodge the foreign matter and therefore require structure and a system for directing the reverse flow. Further, operation of the cleaning means produces a lessening of fluid flow and pressure.

It is an object of the present invention to produce a simply constructed self cleaning filter by providing magnet means which can be rotated simultaneously with a rotatable filter element to remove foreign matter tending to clog the peripheral surface of the filter element.

It is another object of the present invention to improve self cleaning filter devices by providing a collection chamber for foreign matter removed from the filter element and means for removing the foreign matter from the collection chamber without interrupting the operation of the filter device.

Other objects and advantages will readily occur to one skilled in the art upon reference to the following drawings in which like reference characters refer to like parts throughout the several views and in which FIG. 1 is a longitudinal cross sectional view of a preferred embodiment of the present invention.

FIG. 2 is a top elevational view of the device shown in FIG. 1 with parts in cross section for purposes of clarity.

FIG. 6 is a view taken substantially at line 6—6 of FIG. 1.

Figure 3:
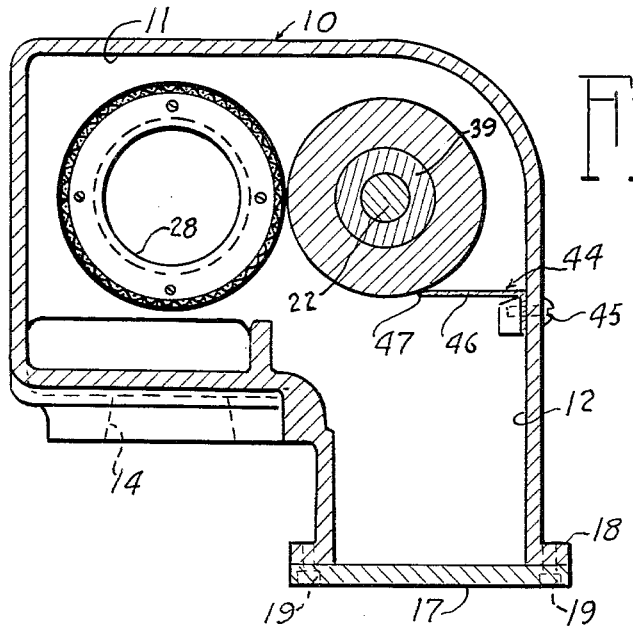
FIG. 3 is a cross sectional view taken substantially at line 3—3 of FIG. 1.

Now referring to the drawings for a detailed description of the present invention, a preferred filter device is illustrated as comprising a housing 10 defining a filter chamber 11 and a collecting chamber 12. The housing 10 is provided with an outlet 13 and an inlet 14 opening to the filter chamber 11. A cap member 15 is preferably secured to the end of the housing 10 opposite the outlet 13 by any means such as bolts or screws (not shown). An O-ring seal 16 prevents fluid leakage between the housing 10 and the cap member 15. As can best be seen in FIG. 3, the collecting chamber 12 is closed at one end by a removable cover 17 secured to a flanged portion 18 of the housing 10 by bolts or screws 19.

A shaft 20 is rotatably carried in the cap member 15 and has a longitudinally grooved portion 20A extending into the filter chamber 11. An elongated bushing 21 is carried in the housing 10 by screws or bolts 21A in a position having its longitudinal axis parallel with the axis of the shaft 20. The bushing 21 provides the means by which a shaft 22 is rotatably carried. Gear members 23–24 are keyed to the shafts 20–22 respectively and a handle 24A is provided on the exterior end of the shaft 20 so that rotation of the handle 24A will act through the gear members 23–24 to produce a simultaneous rotation of the shafts 20–22.

A filter assembly 25 is carried in the filter chamber 11 intermediate the inlet 14 and the outlet 13. The filter assembly 25 comprises an annular member 26 axially slidably carried in the housing 10. A piston ring seal 27 prevents fluid leakage between the annular member 26 and the housing 10. The annular member 26 is provided with a central opening 28 in registry with the outlet 13. The outlet 13 is provided with a counterbore providing an interior shoulder 29 and the annular member 26 is provided with an exterior bearing surface 30. The shoulder 29 and surface 30 provide the seats for a spring member 31, which urges the filter assembly 25 toward a position abutting the cap member 15.

The filter assembly 25 further comprises an annular member 32 having a surface 33 axially slidably carried on an inwardly extending cylindrical boss portion 34 of the cap member 15. The annular member 32 is further provided with a plurality of radially inwardly extending fingers 35 which are axially slidably carried in the grooves of the portion 20A of the shaft 20. The annular member 32 is also provided with a flange portion 36 which engages the housing 10 when the filter assembly 25 is in the position illustrated in FIG. 1.

A porous filter element 37 is retained between the annular members 26–32 by means of a plurality of annularly spaced screws 38.

As can best be seen in FIG. 2, the bushing 21 does not extend the full length of the shaft 22. A cylindrical retaining member 39 is connected to the exposed end of the shaft 22 by a pin 40 which is the driving means. The cylindrical retaining member 39 is provided with an inner peripheral recess 41 shaped complementary to the bushing 21 and permitting the retaining member 39 to be rotated with the shaft 22. A plurality of annular magnets 42 and spacer blocks 43 are alternately carried on the retaining member 39 and are retained in position by flanged end portions 39A provided at each end of the retaining member 39. As is apparent from FIG. 3 the annular magnets 42 and spacers 43 are carried so that a portion of their peripheral surfaces is closely adjacent a portion of the peripheral surface of the filter element 37.

Figure 5:
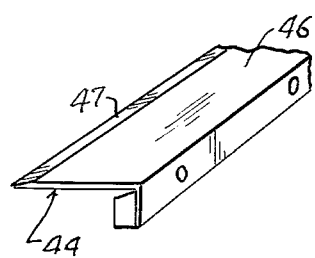
FIG. 5 is a perspective view of a portion of the scraping structure shown in FIG 4.
Figure 4:
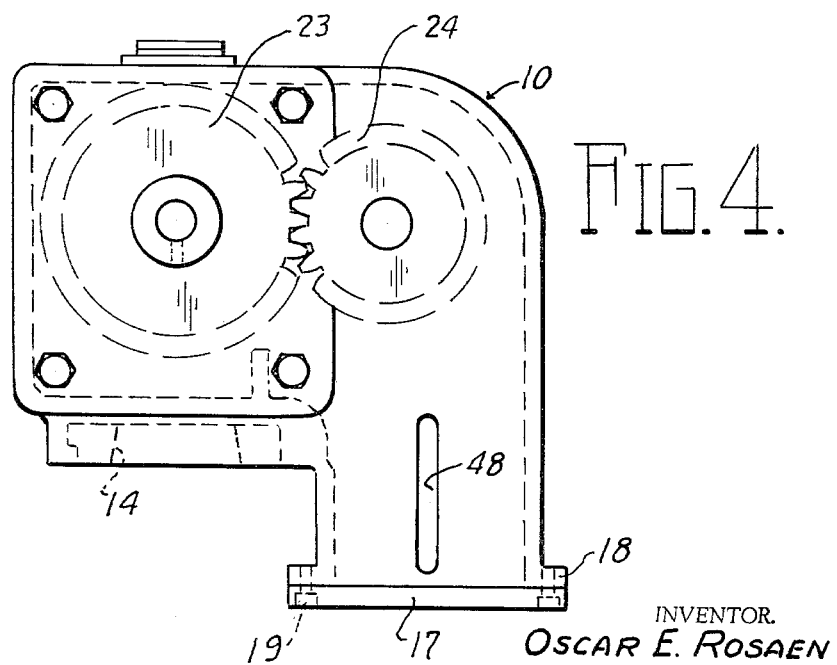
FIG. 4 is an end view taken substantially at line 4—4 of FIG. 1.

As can best be seen in FIGS. 3 and 5 an elongated scraping member 44 is secured to the housing 10 by screws 45 in a position intermediate the magnet assembly and the collecting chamber 12. The scraping member 44 is provided with an elongated blade portion 46 having a sharpened edge 47 which engages a portion of the peripheral surface of the magnet assembly. As is apparent in FIG. 3, it is preferred that the blade 44 be relatively wide, the reasons for which will be explained below. The housing 10 is provided with a sight tube 48 exposing the contents of the collecting chamber 12.

A pin member 49 is rotatably carried in the housing 10 and carries at one end an arm member 50 which engages the flange portion 36 of the annual member 32. A pointer element 51 is carried on the end of the pin member 49 exteriorly of the housing 10. An indicator plate 52 is carried on the housing 10 and is provided with indicia which indicates various operating positions of the filter assembly 25. As the filter assembly 25 moves axially in the filter chamber 11 the pointer element 51 will rotate to a position which indicates that axial position on the indicator plate.

In operation fluid enters the inlet 14 and completely encompasses the peripheral surface of the filter element 37. The fluid then passes through the filter element 37, through the opening 28 and out the outlet 13. As the filter element 37 becomes clogged, a pressure differential is created across the annular member 32 which produces axial movement of the filter assembly 25 against the force of the spring 31. The pointer element 51 will indicate this movement on the exterior of the housing 10.

When the pointer element 51 indicates that unclogging the filter element 37 is desirable, the filter assembly 25 and the magnet assembly can be rotated by the handle 24. The fingers 35 and the grooved end portion 20A have been constructed in such a way that rotative force of the shaft 20 will be transmitted to the filter assembly 25 and yet at the same time the filter assembly 25 can move axially along the shaft 20. The magnets 42 will pick off metal particles which are clogging the filter element 37 as well as other foreign matter which will be adhered to the metal particles. The rotation can be repeated until the pointer element 51 indicates the filter element is sufficiently unclogged. The filter need not be discontinued from operation while it is being cleaned and it is apparent that in place of the handle 24, any rotating means could be substituted. If so desired means could be provided which would periodically rotate the filter and magnet assemblies or which would rotate them only upon sensing a predetermined pressure differential indicating the filter is clogged.

The scraping member 44 will remove the foreign matter adhering to the magnet assembly and is sufficiently wide so that the matter will eventually work out of the field of force of the magnet and fall into the collecting chamber 12. The sight tube 48 will permit inspection of the contents of the collecting chamber 12 and when this needs to be cleaned, the cover 17 can be removed. Again this operation will not disrupt operation of the fluid system.

Although I have described but one embodiment of the present invention it is apparent from the foregoing description that many changes and modifications may be made without departing from the spirit of the invention or the scope of the appended claims.

I claim:
1. A fluid filter device comprising
   (a) a housing defining a filter chamber and a collecting chamber communicating therewith,
   (b) an inlet and an outlet provided in said housing and opening to said filter chamber,
   (c) a substantially cylindrical filter assembly comprising a first annulus and, a second annulus, means axially slidably mounting said filter assembly in said filter chamber and a porous filter member carried between said first annulus and said second annulus.
   (d) means rotatably mounting said filter assembly in said filter chamber intermediate said inlet and said outlet and comprising a shaft rotatably mounted in said housing and means drivingly connecting one end of said shaft to said first annulus,
   (e) a cylindrical magnet member rotatably carried in said filter chamber intermediate said filter assembly and said collecting chamber,
   (f) said magnet member being rotatably carried on an axis parallel to the axis of said filter assembly and in a position such that a portion of the peripheral surface of said magnet member is closely adjacent the peripheral surface of said filter member,
   (g) gear means operably connecting said magnet member to end of said shaft opposite said first annulus,
   (h) means for selectively rotating said gear means whereby said filter assembly and said magnet member are rotated and the portion of the peripheral surface of said magnet member closely adjacent the portion of the peripheral surface of said filter member will be continuously changing during rotation thereof, and
   (i) scraping means carried in said housing closely adjacent a portion of the peripheral surface of said magnet member and intermediate said surface and said collecting chamber whereby particles adhering to said magnet member will be removed by said scraping means.

2. The device as defined in claim 1 and in which said collecting chamber includes means indicating the amount of particles in said collecting chamber.

3. The device as defined in claim 1 and including
   (a) a spring member biasing said filter assembly toward an axial position abutting said housing,
   (b) said second annulus being provided with a portion having one surface disposed on the interior of said filter member and another surface exteriorly of said filter member whereby the pressure differential created across said portion as said filter member becomes clogged will move said filter assembly axially against the force of said spring member, and
   (c) said second annulus including means opening a fluid path bypassing said filter member when said filter assembly reaches a predetermined axial position.

4. The device as defined in claim 3 and including an indicator means carried on the exterior of said housing and being operably connected to said filter whereby the axial position of said filter assembly is indicated on the exterior of the housing.

5. The device as defined in claim 3 and including indicator means rotatably carried in said housing and having an arm portion operably connected to said second annulus and a pointer portion carried exteriorly of said housing whereby the axial position of said filter assembly will be indicated exteriorly of said housing.

6. A fluid filter device comprising
   (a) a housing defining a filter chamber and a collecting chamber communicating therewith,
   (b) an inlet and an outlet provided in said housing and opening to said filter chamber,
   (c) a substantially cylindrical filter assembly comprising a first annulus and, a second annulus, means axially slidably mounting said filter assembly in said filter chamber and a porous filter member carried between said first annulus and said second annulus,
   (d) means rotatably mounting said filter assembly in said filter chamber intermediate said inlet and said outlet and comprising a shaft rotatably mounted in said housing and means drivingly connecting one end of said shaft to said first annulus,
   (e) a cylindrical magnet member rotatably carried in said filter chamber,
   (f) said magnet member being rotatably carried on an axis parallel to the axis of said filter assembly and in a position such that a portion of the peripheral surface of said magnet member is closely adjacent the peripheral surface of said filter member,
   (g) means operably connecting said magnet member to end of said shaft opposite said first annulus,
   (h) means for selectively rotating said last mentioned means whereby said filter assembly and said magnet member are rotated and the portion of the peripheral surface of said magnet member adjacent the portion of the peripheral surface of said filter member will be continuously changing during rotation thereof.

7. The device as defined in claim 6 and including
   (a) pressure responsive means operable to move said filter assembly axially as said filter member becomes clogged and
   (b) a bypass means opening a fluid path between said inlet and said outlet upon said filter assembly reaching a predetermined axial position.

8. A fluid filter device comprising
(a) a housing defining a filter chamber,
(b) an inlet and an outlet provided in said housing and opening to said filter chamber,
(c) a substantially cylindrical filter assembly and means rotatably and axially slidably mounting said filter assembly in said filter chamber,
(d) said means comprising a first shaft rotatably mounted in said housing and extending axially into said filter chamber and means drivingly connecting one end of said shaft to said filter assembly,
(e) magnet means carried in said filter chamber, said magnet means comprising a second shaft rotatably mounted in said housing and extending axially into said filter chamber and a magnet member carried by said shaft and being provided with a surface portion extending closely adjacent said filter assembly and substantially the entire length thereof.
(f) means for rotating said shafts together whereby the adjacent surface portions of said magnet member and said filter assembly will be continuously changing during rotation of said shafts,
(g) pressure responsive means operable to move said filter assembly axially along said shaft in response to increases in the pressure differential across said filter assembly, and
(h) indicator means operably conected to said filter assembly to indicate exteriorly of said housing the axial position of said filter assembly.

9. The fluid filter device as defined in claim 8 and including a valve means actuated upon axial movement of said filter assembly to a predetermined axial position to open a fluid path directly from said inlet to said outlet bypassing said filter assembly.

References Cited by the Examiner

UNITED STATES PATENTS

| | | | |
|---|---|---|---|
| 449,251 | 3/1891 | Decker | 210—386 |
| 1,216,677 | 2/1917 | Feilmann | 55—291 |
| 1,546,330 | 7/1925 | Ullrich | 209—215 |
| 1,797,597 | 3/1931 | Ullrich | 209—38 |
| 2,136,853 | 11/1938 | Knecht | 210—397 |
| 2,354,150 | 7/1944 | Skinner | 210—397 X |
| 2,936,731 | 5/1960 | Rosaen | 210—90 |
| 3,053,389 | 9/1962 | Rosaen | 210—90 |

FOREIGN PATENTS

| | | |
|---|---|---|
| 349,909 | 4/1921 | Germany. |
| 681,379 | 10/1952 | Great Britain. |
| 817,577 | 8/1959 | Great Britain. |

REUBEN FRIEDMAN, *Primary Examiner.*

HERBERT L. MARTIN, *Examiner.*